United States Patent
Hwang

(10) Patent No.: US 9,195,963 B2
(45) Date of Patent: Nov. 24, 2015

(54) ELECTRONIC DEVICE AND METHOD FOR SOCIAL NETWORKING SERVICE

(75) Inventor: Hyesun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 917 days.

(21) Appl. No.: 13/426,833

(22) Filed: Mar. 22, 2012

(65) Prior Publication Data

US 2012/0303726 A1  Nov. 29, 2012

(30) Foreign Application Priority Data

May 23, 2011  (KR) .................. 10-2011-0048335

(51) Int. Cl.
- *G06F 15/16* (2006.01)
- *G06Q 10/10* (2012.01)
- *H04L 12/58* (2006.01)
- *G06Q 50/00* (2012.01)

(52) U.S. Cl.
CPC ................ *G06Q 10/10* (2013.01); *G06Q 50/01* (2013.01); *H04L 51/32* (2013.01)

(58) Field of Classification Search
None
See application file for complete search history.

(56) References Cited

U.S. PATENT DOCUMENTS

| 8,010,602 B2* | 8/2011 | Shen .................... G06Q 10/107 709/204 |
| 2005/0171799 A1* | 8/2005 | Hull et al. .......................... 705/1 |
| 2005/0216550 A1* | 9/2005 | Paseman ................ G06Q 10/00 709/202 |
| 2009/0271370 A1 | 10/2009 | Jagadish et al. |
| 2010/0057859 A1* | 3/2010 | Shen .................... G06Q 10/107 709/206 |
| 2011/0055333 A1* | 3/2011 | Guy ...................... G06Q 10/107 709/206 |
| 2011/0179125 A1* | 7/2011 | Lee et al. ...................... 709/206 |
| 2011/0238701 A1 | 9/2011 | Liang et al. |

FOREIGN PATENT DOCUMENTS

| CN | 101446961 A | 6/2009 |
| CN | 101540739 A | 9/2009 |
| CN | 101645926 A | 2/2010 |

* cited by examiner

*Primary Examiner* — Brian P Whipple
(74) *Attorney, Agent, or Firm* — Birch, Stewart, Kolasch & Birch, LLP

(57) ABSTRACT

An electronic device including a communication unit configured to receive a social network formation history for a subscriber of a specific Social Networking Service (SNS) for other subscribers of the specific SNS in an SNS environment including the specific SNS; and a controller configured to change an application range of a function provided by an application for the specific SNS and to form a social network based on the social network formation history for the subscriber.

20 Claims, 21 Drawing Sheets

ELECTRONIC DEVICE AND METHOD FOR SOCIAL NETWORKING SERVICE

This application claims the benefit of Korean Patent Application No. 10-2011-0048335 filed on May 23, 2011, which are hereby incorporated by reference.

BACKGROUND OF THE INVENTION

1. Field of Invention

The present invention relates to Social Networking Service (hereinafter referred to as 'SNS') and, more particularly, to an electronic device and a method for changing the application range of a function provided by an application for SNS so that a social network can be formed.

2. Description of the Related Art

As the functions of mobile terminals such as a notebook, a mobile phone, and a smart phone, and fixed type electronic devices such as TV and a PC are diversified, the terminal is being implemented into a multimedia player equipped with complex functions such as taking a photograph or capturing a moving image, playing music or a moving image file, playing a game, and receiving broadcasts.

Recently, many users are using SNS using not only the mobile terminals, but also smart TV. In current SNS environments, however, other uses blocked or avoided by a user may be recommended to the user by friends. Furthermore, in current SNS environments, writings or replies written by the user may be open to the other users.

SUMMARY OF THE INVENTION

Accordingly, an object of the present invention is to address the above-noted and other problems.

Another object of the present invention is to allow a user of an electronic device to change the application range of a SNS function based on the user's s social network formation history.

Another object of the present invention is to allow the user to change the application range of SNS functions such ad a friend recommendation function, the disclosure range of content between users, etc.

To achieve these and other advantages and in accordance with the purpose of the present invention, as embodied and broadly described herein, the present invention provides in one aspect an electronic device including a communication unit configured to receive a social network formation history for a subscriber of a specific Social Networking Service (SNS) for other subscribers of the specific SNS in an SNS environment including the specific SNS; and a controller configured to change an application range of a function provided by an application for the specific SNS and to form a social network based on the social network formation history for the subscriber.

In another aspect, the present invention provides a method of controlling an electronic device, and which includes receiving, via a communication unit of the electronic device, a social network formation history for a subscriber of a specific Social Networking Service (SNS) for other subscribers of the specific SNS in an SNS environment including the specific SNS; and changing, via a controller of the electronic device, an application range of a function provided by an application for the specific SNS and to form a social network based on the social network formation history for the subscriber.

In still another aspect, the present invention provides a computer program product embodied on a computer programmable medium and including instructions configured to be executed on a computer. The computer program product includes a first computer code to receive and read a social network formation history for a subscriber of a specific Social Networking Service (SNS) for other subscribers of the specific SNS in an SNS environment including the specific SNS; and a second computer code configured to change an application range of a function provided by an application for the specific SNS and to form a social network based on the social network formation history for the subscriber.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal according to an embodiment of the present invention will be described below in more detail with reference to the accompanying drawings. The mobile terminal described in the specification can include a cellular phone, a smart phone, a laptop computer, a digital broadcasting terminal, personal digital assistants (PDA), a portable multimedia player (PMP), a navigation system and so on.

Figure 1:
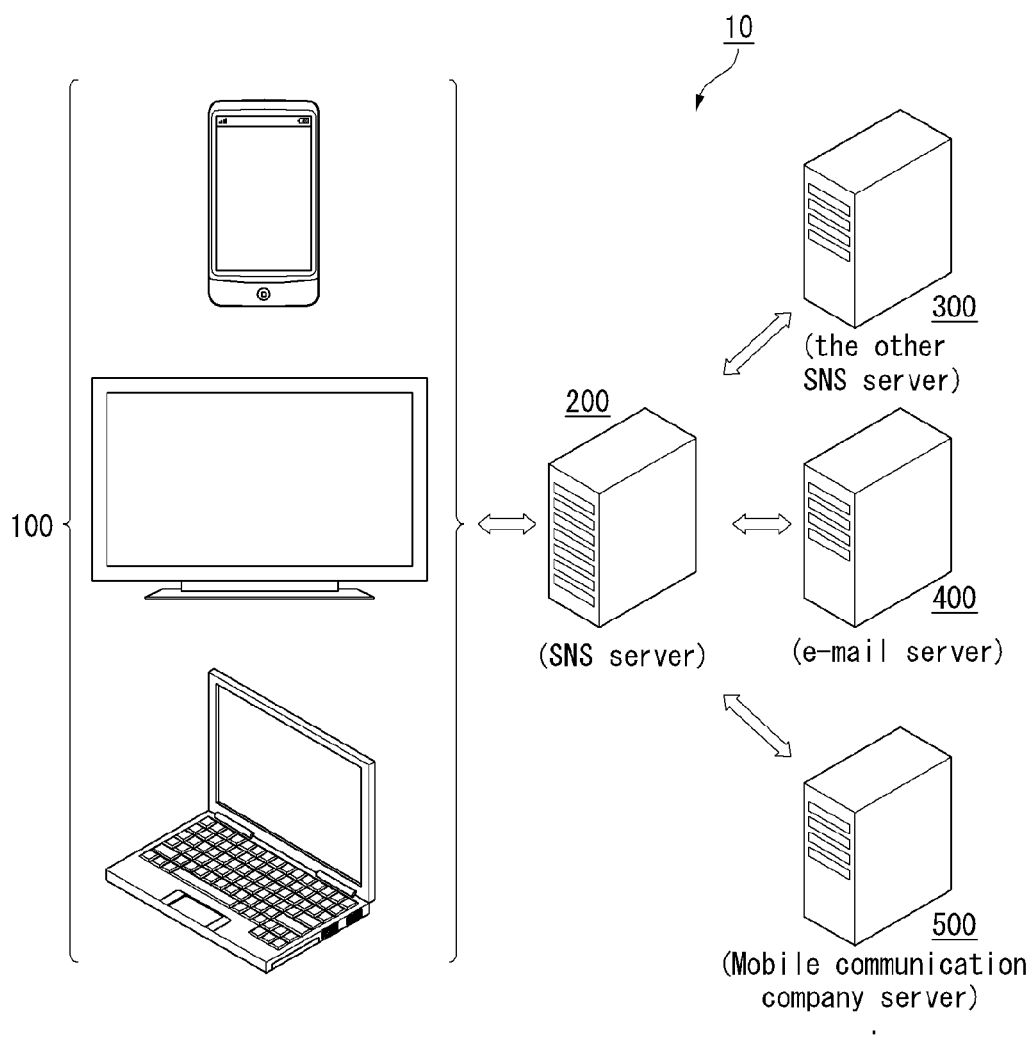
FIG. 1 is an overview illustrating a system for providing SNS according to an embodiment of the present invention.

FIG. 1 is an overview illustrating a system 10 for providing SNS according to an embodiment of the present invention. Referring to FIG. 1, the system 10 includes an electronic device 100, an SNS server 200, another SNS server 300, an e-mail server 400, and a mobile communication company server 500. The SNS server 200 may be coupled to the electronic device 100 in which an application for a specific SNS is installed and configured to provide service to the subscribers of the specific SNS.

Furthermore, the SNS server 200 may receive a social network formation history for a subscriber of the specific SNS from the other SNS server 300, the e-mail server 400, and the mobile communication company server 500 which are connected thereto over a network and transmit the social network formation history for the subscriber to the electronic device 100. The SNS server 200 may also be coupled to other systems in order to receive the social network formation history for the subscriber of the specific SNS.

The social network formation history for the subscriber may include a personal network (e.g., a list of friends) formed by the subscriber of the specific SNS, a friend whose social network formation has been blocked by the subscriber of the specific SNS, the number and frequency of social networks formed between the subscriber of the specific SNS and the other subscriber, a point of time at which the last social network was formed between the subscriber of the specific SNS and the other subscriber, etc. in the other SNS system provided by the other SNS server 300, but the scope of the present invention is not limited thereto. The social network formation history for the subscriber of the specific SNS may further include a social network formation history in the specific SNS.

Here, the term 'social network formation' may include not only the formation of a personal network between subscribers in an SNS system, but also an exchange of instant messages between subscribers, an exchange of text messages between subscribers, the writing of messages and replies between subscriber.

In addition, the social network formation history for the subscriber of the specific SNS may further include a social network formation history related to e-mail between the subscriber of the specific SNS and the other subscribers. The social network formation history related to e-mail may include whether the subscriber has registered other subscribers with an address book, the number or frequency of e-mails exchanged between the subscriber and the other subscribers, a point of time at which the subscriber finally transmitted and received e-mail to and from the other subscribers, but the scope of the present invention is not limited thereto. The social network formation history related to e-mail may be transmitted from the e-mail server 400 to the SNS server 200.

The social network formation history for the subscriber of the specific SNS may include a social network formation history related to mobile communication such as the number and frequency of telephone calls made and Short Message Service (MS) messages and Multimedia Messaging Service (MMS) messages transmitted and received between the subscriber of the specific SNS and the other subscribers, the last point of time between the subscriber of the specific SNS and the other subscribers, and so on, but the scope of the present invention is not limited thereto. The social network formation history related to mobile communication may be transmitted from the mobile communication company server 500 to the SNS server 200.

That is, an SNS environment where the SNS server 200 receives the social network formation history for the subscriber may include a specific SNS system, the other SNS system, an e-mail service system, mobile communication service, and so on, but the scope of the present invention is not limited thereto. A social network formed by the subscriber may also include direct or indirect exchange formed between the subscriber and the other subscribers over a network.

When the social network formation history for the subscriber is received from the SNS server 200, the electronic device 100 may change the application range of a function, provided by an application for the specific SNS so that a social network can be formed, based on the received social network formation history for the subscriber. For example, the electronic device 100 may change a range of a friend recommendation function, provided by an application for the specific SNS, based on the social network formation history for the subscriber of the specific SNS. More particularly, if the range of the friend recommendation provided by the application for the specific SNS includes even a friend of a subscriber who has been registered as a friend of the subscriber, the electronic device 100 may extend or reduce the range of friend recommendation according to a social network formation history for the subscriber who has been registered as the friend.

The function provided by the application for the specific SNS so that a social network can be formed may include recommendation functions such as the above friend recommendation function, a group recommendation function formed of a plurality of subscribers, and a content recommendation function, but the range of friend recommendation provided by the application for the specific SNS is not limited to the above examples. The function provided by the application for the specific SNS so that a social network can be formed may also include a function of providing the subscriber with information and content of the other subscribers related to the subscriber and a function of disclosing information and content, related to the subscriber, to the other subscribers.

For example, the electronic device 100 may change the disclosure range of content, related to the subscriber and provided by the application for the specific SNS, based on the social network formation history for the subscriber of the specific SNS. More particularly, if the disclosure range of content related to the subscriber is set to extend up to a friend of a friend who has been registered as a friend of the subscriber in the application for the specific SNS, the electronic device 100 may extend the disclosure range of content, related to the subscriber, to a friend of a subscriber registered as a friend or reduce the disclosure range of content to subscribers, registered as friends, according to a social network formation history for the subscriber.

Figure 2:
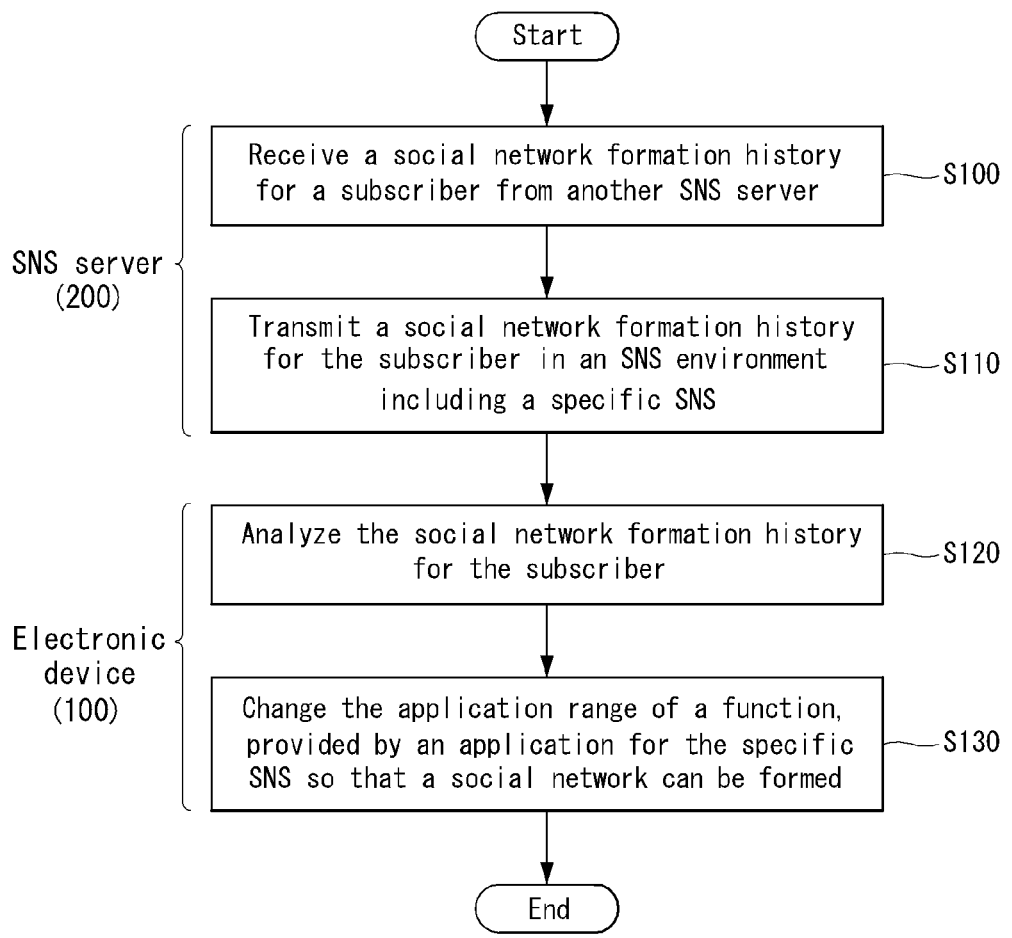
FIG. 2 is a flowchart illustrating an SNS method performed in the system according to the embodiment of the present invention shown in FIG. 1.

Next, FIG. 2 is a flowchart illustrating an SNS method performed in the system 10 according to the embodiment of the present invention shown in FIG. 1. The SNS method is described below with reference to FIGS. 1 and 2. First, the SNS server 200 receives a social network formation history for a subscriber of a specific SNS from the other SNS server 300, the e-mail server 400, the mobile communication company server 500, and so on (step S100). Next, the SNS server 200 transmits social network formation history for the other subscribers of the specific SNS including the social network formation history for the subscriber received from the other SNS server 300, etc. and a social network formation history formed by the subscriber through the specific SNS in the SNS environment of the subscriber, to the electronic device 100 (S110).

The electronic device 100 analyzes the received social network formation history for the subscriber received from the electronic device 100 (S120). Next, the electronic device 100 changes the application range of a function, provided by an application for the specific SNS so that a social network can be formed, based on a result of the analysis (step S130).

The analysis of the social network formation history for the subscriber has been illustrated to be performed by the electronic device 100 in FIG. 1. According to an embodiment of the present invention, the SNS server 200 may analyze the social network formation history for the subscriber and transmit a result of the analysis to the electronic device 100. Furthermore, according to another embodiment of the present invention, the SNS server may change the application range of the function provided by the application for the specific SNS, and an embodiment thereof is described below with reference to FIGS. 3 and 4.

Figure 3:
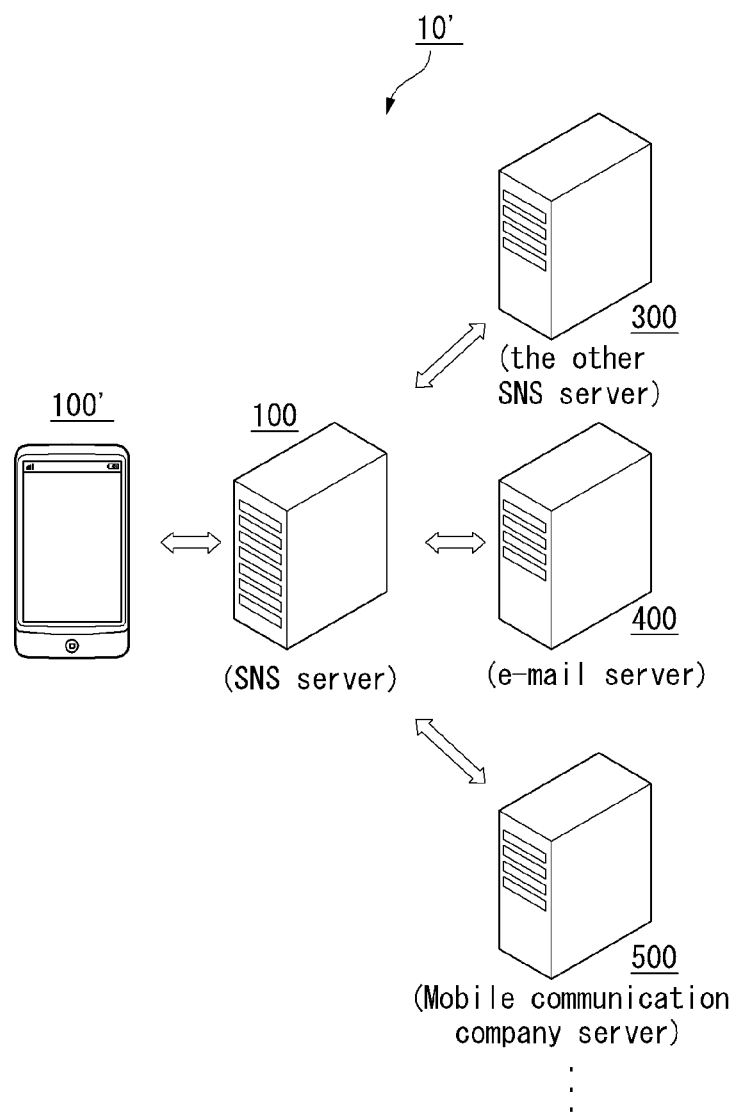
FIG. 3 is an overview illustrating a system for providing SNS according to another embodiment of the present invention.

FIG. 3 shows the construction of a system 10' for providing SNS according to another embodiment of the present invention. Referring to FIG. 3, the system 10' includes a mobile terminal 100' and the SNS server 100, the other SNS server 300, the e-mail server 400, and the mobile communication company server 500 according to the embodiment of the present invention.

Like the system 10 of FIG. 1, the system 10' receives the social network formation history for the subscriber from the other SNS server 300, the e-mail server 400, the mobile communication company server 500, and so on. Unlike in the system 10 of FIG. 1, in the system 10', the SNS server 100 changes the application range of a function provided by an application for a specific SNS so that the subscriber can form a social network. In other words, in the system 10', the SNS server 100 corresponds to the electronic device of FIG. 1 according to an embodiment of the present invention. The SNS server 100 then provides service to the mobile terminal 100' that has executed the application for the specific SNS when the application range of the function provided by the application for the specific SNS has been changed.

Figure 4:
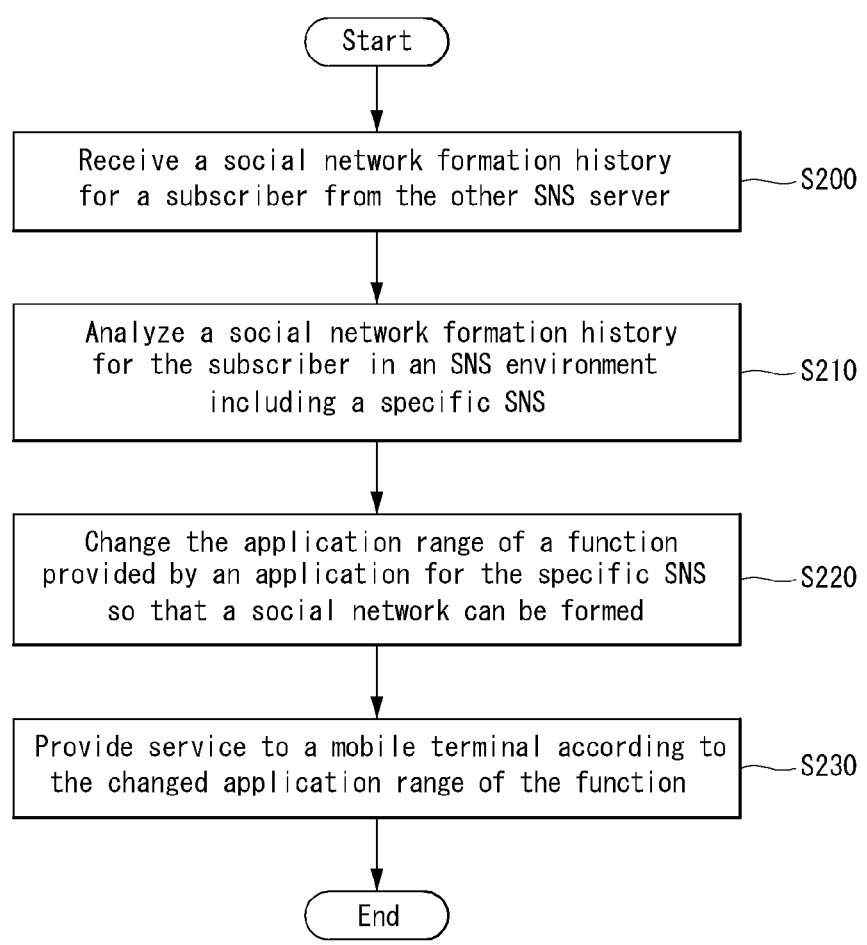
FIG. 4 is a flowchart illustrating an SNS method performed in the system according to the embodiment of the present invention shown in FIG. 3.

Next, FIG. 4 is a flowchart illustrating an SNS method performed in the system 10' according to the embodiment of the present invention shown in FIG. 3. The SNS method is described below with reference to FIGS. 3 and 4. First, the SNS server 100 receives a social network formation history for a subscriber of a specific SNS from the other SNS server 300, the e-mail server 400, the mobile communication company server 500, and so on (step S200). Next, the SNS server 200 analyzes a social network formation history for the other subscribers of the specific SNS in the SNS environment of the subscriber, including the social network formation history for the subscriber, received from the other SNS server 300, etc., and a social network formation history formed by the subscriber through the specific SNS (step S210).

Next, the SNS server 100 changes the application range of a function, provided by an application for the specific SNS so that a social network can be formed, based on a result of the analysis (step S220) and provides service to the mobile terminal 100' based on the changed application range of the function (step S230). Here, the mobile terminal 100' may apply the changed application range of the function to the application for the specific SNS already installed.

The examples where the electronic device according to an embodiment of the present invention may change the application range of a function, provided by an application for a specific SNS so that a social network can be formed, based on a social network formation history for the subscriber of the specific SNS has been described above with reference to FIGS. 1 to 4. Hereinafter, examples where an electronic device according to an embodiment of the present invention changes the application range of a function provided by an application for a specific SNS are described in detail below by taking a mobile terminal as an example of the electronic device according to an embodiment of the present invention.

Figure 5:
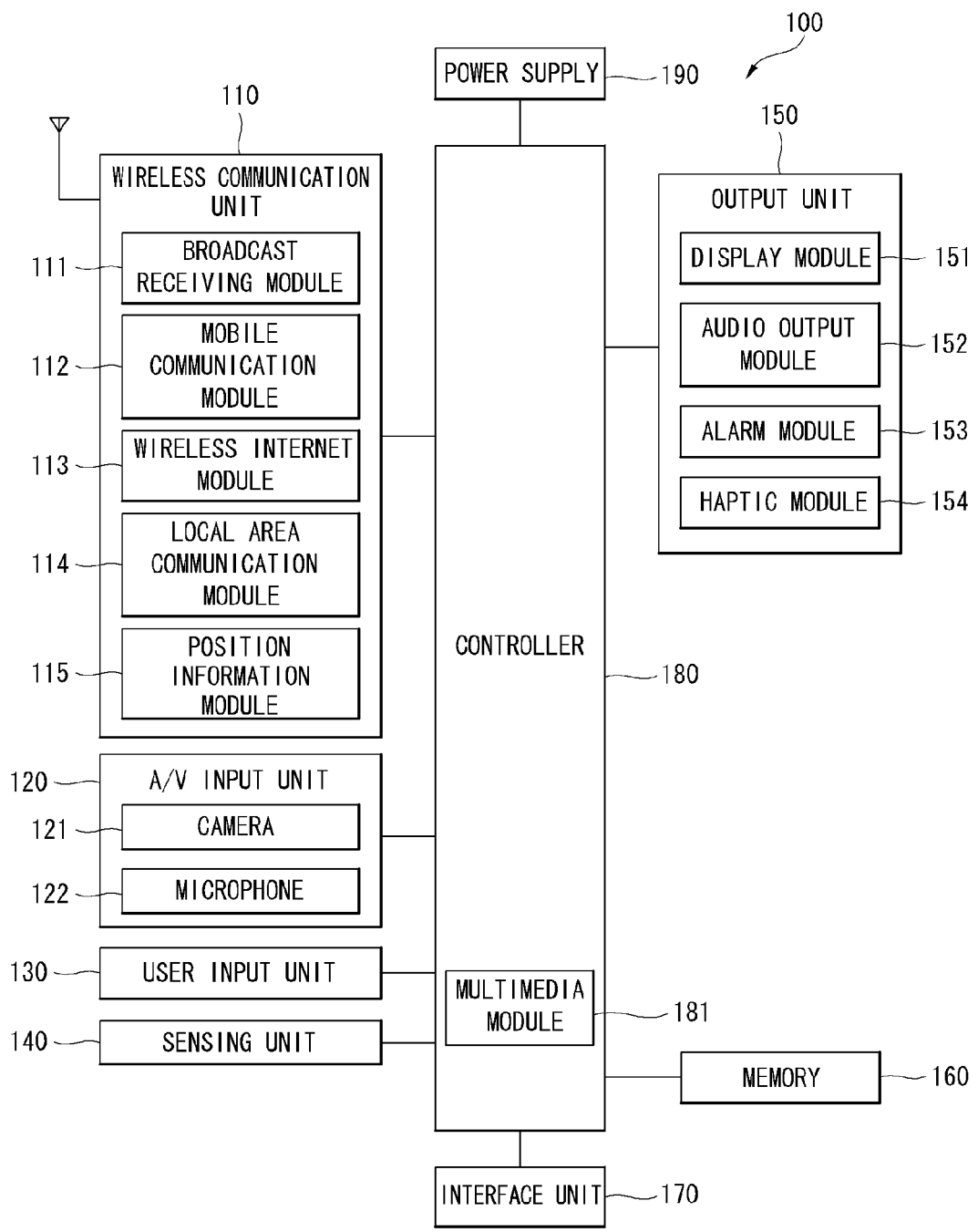
FIG. 5 is a block diagram of a mobile terminal according to an embodiment of the present invention.

FIG. 5 is a block diagram of the mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The number of components included in the mobile terminal can be varied.

The components of the mobile terminal will now be described. The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112. The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 5, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151. The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received. The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154. The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display. Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

When the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example. Further, the touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Also, the sensing unit in FIG. 5 can include a proximity sensor located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The construction of the mobile terminal 100 according to an embodiment of the present invention has been described above with reference to FIG. 5. Examples where the mobile terminal 100 according to an embodiment of the present invention changes the application range of a function provided by an application for a specific SNS so that a subscriber of the specific SNS can form a social network are described in detail below.

Figure 6:
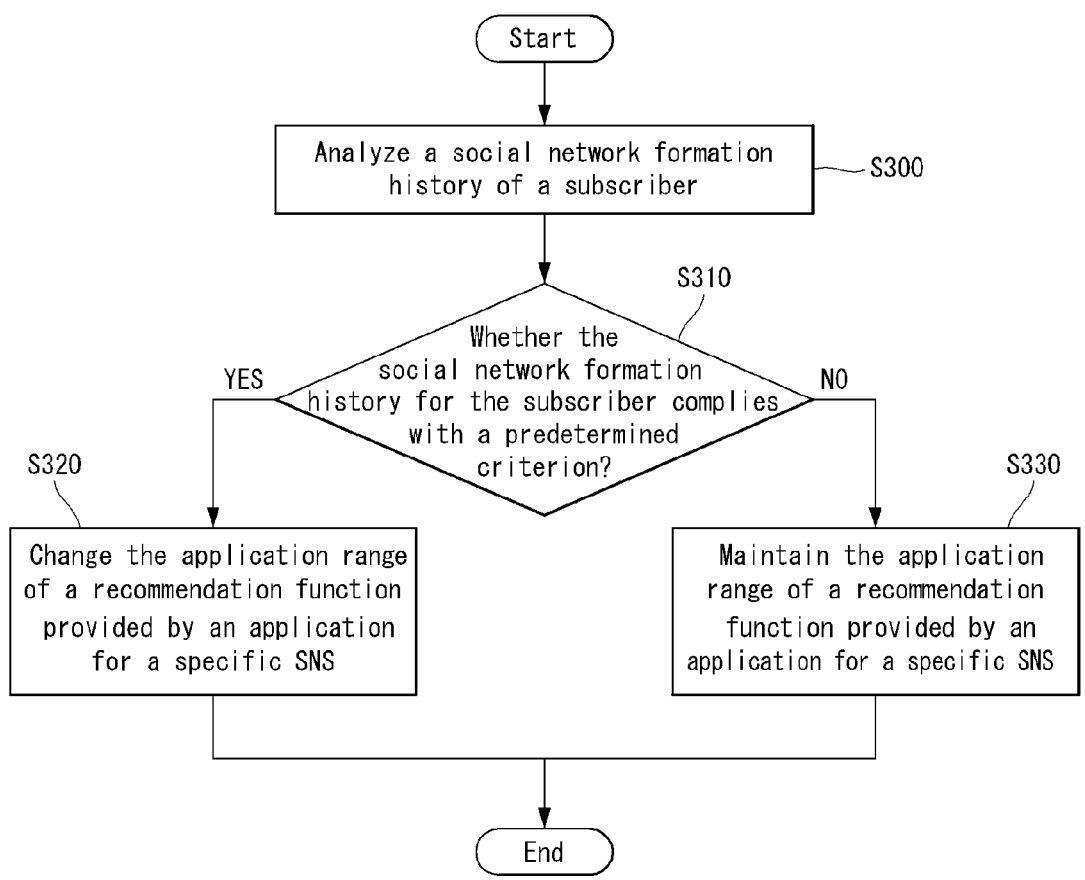
FIG. 6 is a flowchart illustrating an example of an SNS method performed in the mobile terminal according to an embodiment of the present invention.

FIG. 6 is a flowchart illustrating an example of an SNS method performed in the mobile terminal 100 according to the embodiment of the present invention. More particularly, FIG. 6 is a flowchart illustrating a method of the mobile terminal 100 changing the range of a recommendation function, provided by an application for a specific SNS, based on a social network formation history for a subscriber of the specific SNS.

As shown, the controller 180 analyzes the social network formation history for the subscriber received from the SNS server 200 through the wireless communication unit 110 (step S300), and determines whether the social network formation history for the subscriber complies with a predetermined criterion (step S310). If, as a result of the determination, the social network formation history for the subscriber is determined to comply with the predetermined criterion (Yes in step S310), the controller 180 changes the application range of a recommendation function provided by the application for the specific SNS (S320). If, as a result of the determination, the social network formation history for the subscriber is determined not to comply with the predetermined criterion (No in step S310), however, the controller 180 maintains the application range of a recommendation function provided by the application for the specific SNS without change (step S330).

The recommendation function provided by the application for the specific SNS may include a friend recommendation function, a group recommendation function, a content recommendation function, and so on, but the scope of the present invention is not limited thereto. Furthermore, a recommendation provided by the mobile terminal 100 may include a recommendation related to the other subscribers for the subscriber and a recommendation related to the subscriber for the other subscribers.

Examples of the application range of the recommendation function provided by the mobile terminal 100 are described below with reference to FIGS. 7 to 15. In particular, FIGS. 7 to 9 show processes in which a social network formed in the other SNS system by the subscriber of the specific SNS is used for a friend recommendation in an application SNS APP1 for the specific SNS in the mobile terminal according to an embodiment of the present invention.

Figure 7:
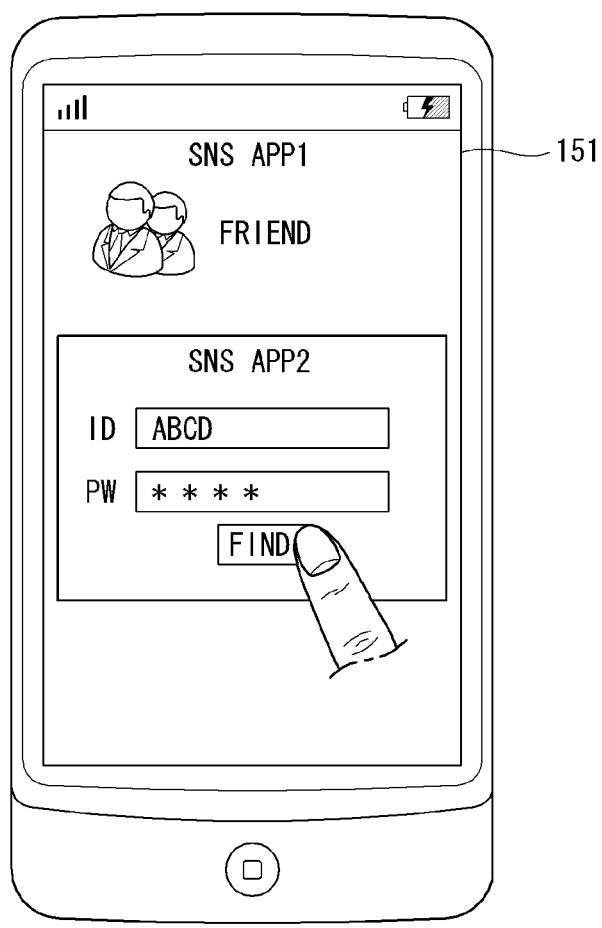
FIGS. 7 to 9 are overviews illustrating processes in which a social network formed in the other SNS system by a subscriber of a specific SNS is used for a friend recommendation in an application for the specific SNS in the mobile terminal according to an embodiment of the present invention.

FIG. 7 illustrates that, in the execution screen of the application SNS APP1 for the specific SNS, a subscriber may enter his ID and password, already registered in the application SNS APP1 for the specific SNS (hereinafter referred to as SNS APP1), in an application SNS APP2 for the other SNS (hereinafter referred to as SNS APP2) and search for a friend candidate to be added in the application SNS APP1.

Figure 8:
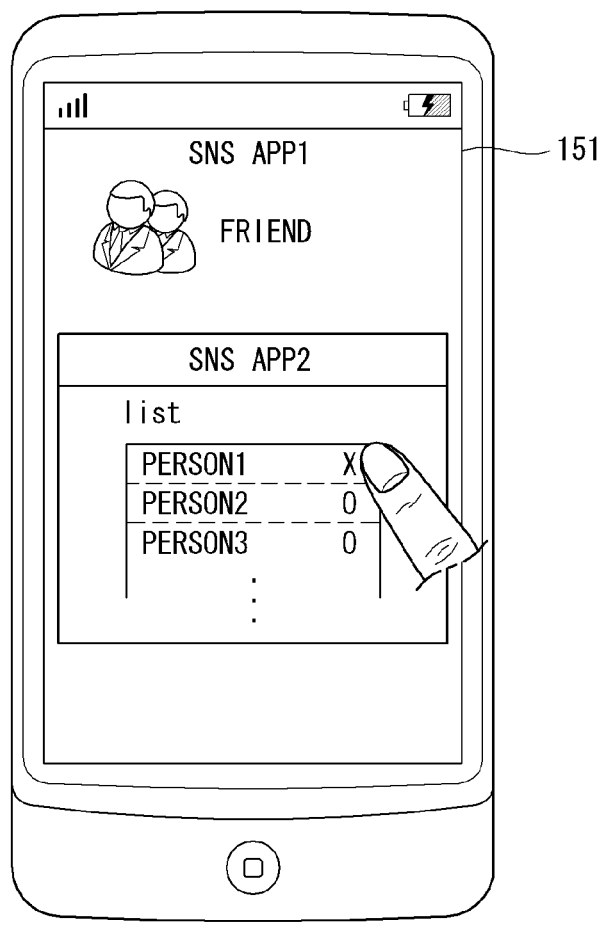

FIG. 8 illustrates that the mobile terminal 100 providing a list of friends formed by the subscriber in the application SNS APP2. The subscriber can select the other subscribers to be registered as friends in the application SNS APP1. For reference, in the list of friends shown in FIG. 8, a mark 'X' indicates a friend who has been blocked by the other subscriber in the application SNS APP2, and a mask 'O' indicates a friend who has been normally registered by the subscriber in the application SNS APP2.

Figure 9:

If the subscriber selects the friend blocked in the application SNS APP2 as shown in FIG. 8, the mobile terminal 100 displays a message window, querying whether the friend blocked in the application SNS APP2 will be registered as a friend in the application SNS APP1, as shown in FIG. 9.

The friend recommendation processes in the mobile terminal 100 according to the embodiment of the present invention, described above with reference to FIGS. 7 to 9, may also be likewise applied to a friend recommendation process in which at least one of the number or frequency of social networks formed in the application SNS APP2 of the subscriber and a point of time at which a social network is formed fall below a predetermined criterion.

Figure 10:
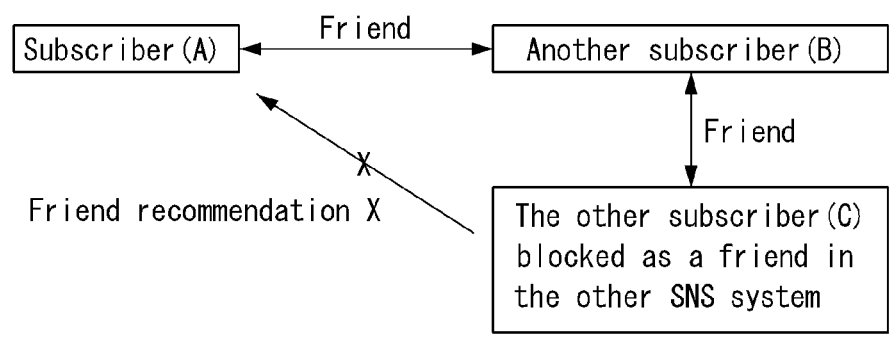
FIG. 10 is a diagram illustrating an example where the mobile terminal excludes other subscriber of a specific SNS from a friend recommendation even in an application for the specific SNS, if a subscriber of the specific SNS has blocked the other subscriber in the other SNS.

Next, FIG. 10 shows an example where the mobile terminal 100 according to an embodiment of the present invention excludes the other subscriber C of a specific SNS from a friend recommendation even in an application for the specific SNS, if a subscriber A of the specific SNS has blocked the other subscriber C in the other SNS. It is first assumed that a range of friend recommendation to the subscriber in the application for the specific SNS extends up to a friend who is a friend of the subscriber. Referring to FIG. 10, the subscriber A is friends with a subscriber B, and the subscriber B is friends with a subscriber C. As shown in FIG. 10, the mobile terminal 100 does not recommend the other subscriber C as a friend to the subscriber A in the application for the specific SNS. This is because the other subscriber C is a friend who has been blocked by the subscriber A in an application for the other SNS.

Like in the friend recommendation method shown in FIG. 10, if the number of social networks formed by the subscriber with the other subscriber in an application for the other SNS is smaller than a predetermined number, the frequency of social networks formed by the subscriber with the other subscriber in the application for the other SNS is smaller than a predetermined frequency, and a specific period of time has elapsed from a point of time at which the last social network was formed, the mobile terminal 100 may exclude the other subscriber from a friend recommendation to the subscriber.

Figure 11:
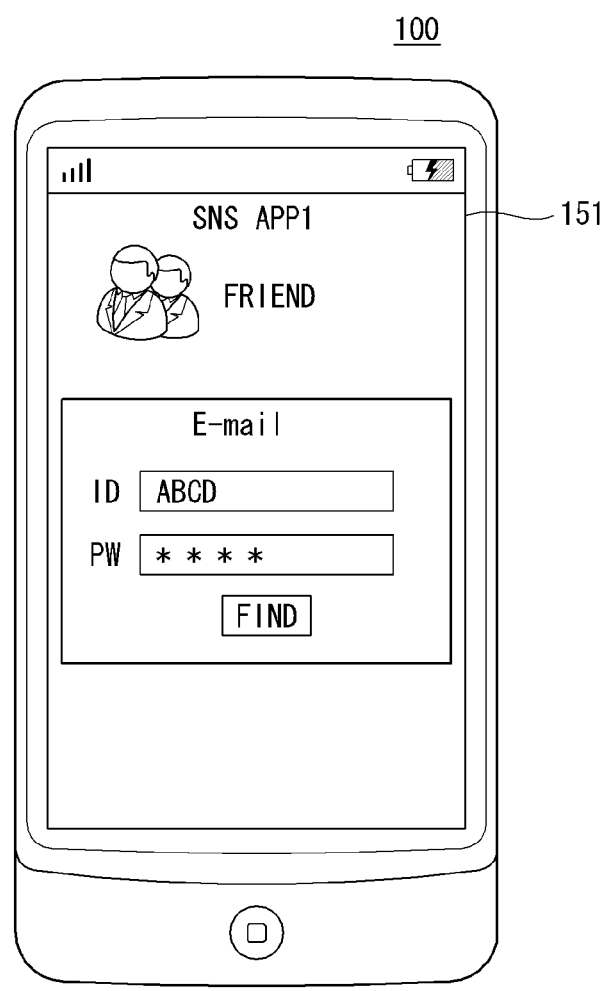
FIG. 11 is an overview illustrating an example where a social network formed in an e-mail system by a subscriber of a specific SNS is used for a friend recommendation in an application for the specific SNS in the mobile terminal according to an embodiment of the present invention.

Next, FIG. 11 shows an example where a social network formed in an e-mail system by a subscriber of a specific SNS is used for a friend recommendation in an application for the specific SNS in the mobile terminal 100 according to an embodiment of the present invention. In particular, FIG. 11 illustrates that, in the execution screen of an application SNS APP1, the subscriber may enter his ID and password already registered in the e-mail system and search for a list of friends to be added in the application SNS APP1.

The friend recommendation processes in the mobile terminal 100 according to the embodiment of the present invention, described above with reference to FIGS. 7 to 9, may also be likewise applied to a friend recommendation process according to at least one of whether a mail for the other subscriber has been blocked in the e-mail system of the subscriber, whether a spam mail for the other subscriber has been set, the number or frequency (or both) of mails transmitted and received, and a point of time at which a mail has recently be transmitted and received.

Figure 12:
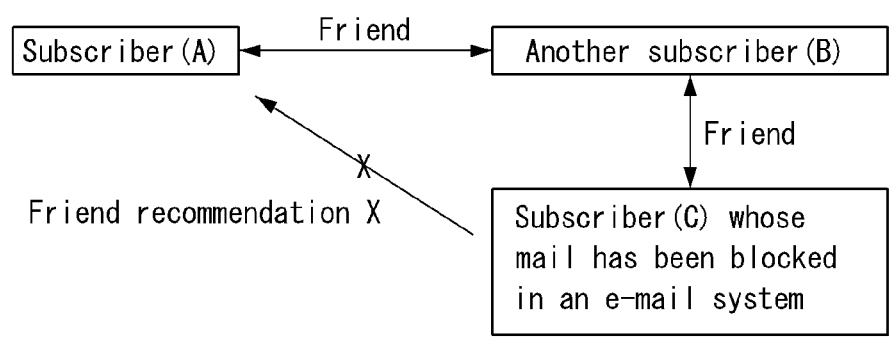
FIG. 12 is a diagram illustrating an example where the mobile terminal according to an embodiment of the present invention excludes the other subscriber of a specific SNS from a friend recommendation even in an application for the specific SNS, if a subscriber of the specific SNS has blocked the other subscriber in an e-mail system.

FIG. 12 shows an example where the mobile terminal 100 according to an embodiment of the present invention excludes the other subscriber C of a specific SNS from a friend recommendation even in an application for the specific SNS, if a subscriber A of the specific SNS has blocked the other subscriber C in an e-mail system.

This example also assumes that a range of friend recommendation to the subscriber in the application for the specific SNS extends up to a friend who is a friend of the subscriber. Referring to FIG. 12, the mobile terminal 100 does not recommend the subscriber C as a friend of the subscriber A. This is because the other subscriber C is a subscriber whose mail has been blocked by the subscriber A in the e-mail system. FIG. 12 also illustrates subscriber A is a friend of the subscriber B, and the subscriber B is a friend of the subscriber A in the application for the specific SNS.

Like in the friend recommendation method shown in FIG. 12, if the mail of the other subscriber C has been set as a spam mail, the number of mails of the subscriber A transmitted to and received from the other subscriber C is smaller than a predetermined number, the frequency of mails of the subscriber A transmitted to and received from the other subscriber C is smaller than a predetermined frequency, and a specific period of time has elapsed from a point of time at which the last mail was transmitted or received, the mobile terminal 100 may exclude the other subscriber C from a friend recommendation to the subscriber A.

Figure 13:
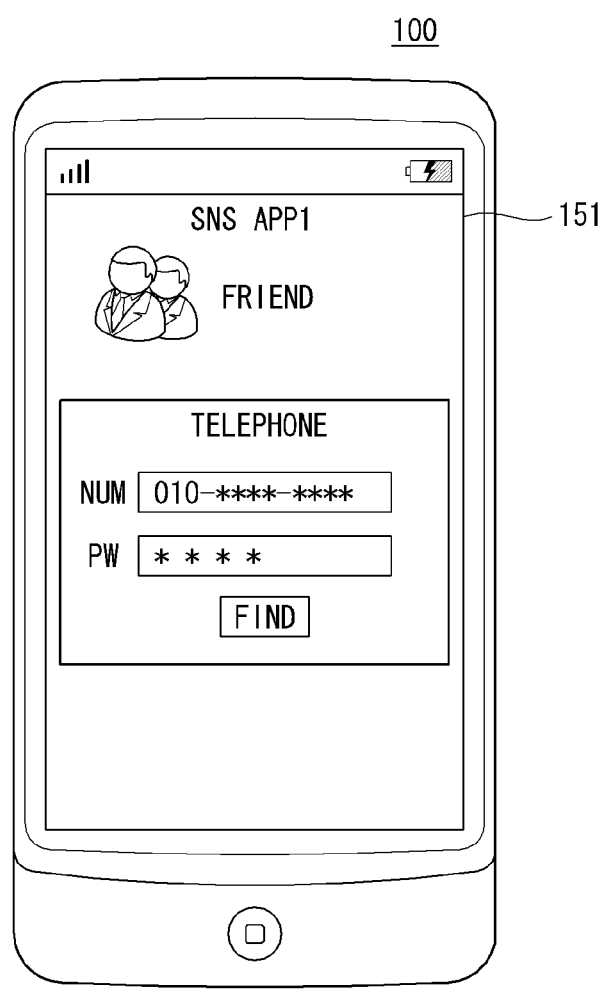
FIG. 13 is an overview illustrating an example where a social network formed in a mobile communication system by a subscriber of a specific SNS is used for a friend recommendation in an application for the specific SNS in the mobile terminal according to an embodiment of the present invention.

FIG. 13 shows an example where a social network formed in a mobile communication system by a subscriber of a specific SNS is used for a friend recommendation in an application SNS APP1 for the specific SNS in the mobile terminal 100 according to an embodiment of the present invention. In particular, FIG. 13 illustrates that, in the execution screen of the application SNS APP1 for the specific SNS, the subscriber may enter his telephone number and password and search for a friend candidate to be added in the application SNS APP1.

The friend recommendation processes in the mobile terminal 100 according to an embodiment of the present invention, described above with reference to FIGS. 7 to 9, may also be likewise applied to a friend recommendation process according to at least one of whether an incoming call from the other subscriber has been blocked in the e-mail system of the subscriber, the number or frequency (or both) of calls and messages (including SMS, MMS, and e-mail) transmitted and received, and a point of time at which the last call or message was transmitted and received.

Figure 14:
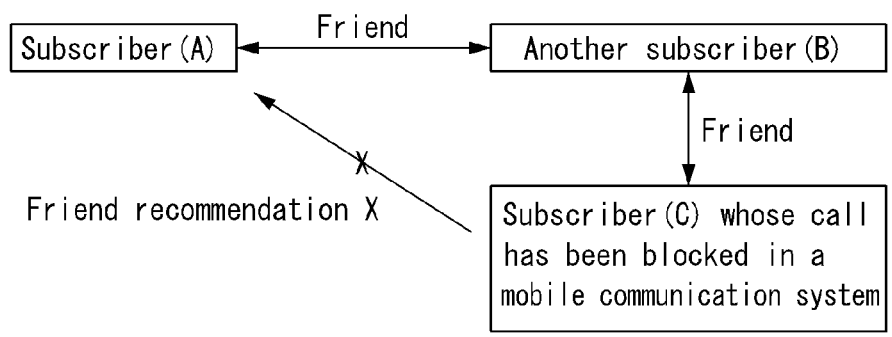
FIG. 14 is a diagram illustrating an example where the mobile terminal according to an embodiment of the present invention excludes the other subscriber of a specific SNS from a friend recommendation even in an application for the specific SNS, if a subscriber of the specific SNS has blocked a call received from the other subscriber in a mobile communication system.

FIG. 14 shows an example where the mobile terminal 100 according to an embodiment of the present invention excludes the other subscriber C of a specific SNS from a friend recommendation even in an application for the specific SNS, if a subscriber A of the specific SNS has blocked a call received from the other subscriber C in a mobile communication system. This example assumes that a range of friend recommendation to the subscriber in an application for the specific SNS extends up a friend who is a friend of the subscriber A.

Referring to FIG. 14, the mobile terminal 100 does not recommend the other subscriber C as a friend of the subscriber A. This is because the other subscriber C is a subscriber whose call received by the subscriber A has been blocked in the mobile communication system. FIG. 14 also illustrates subscriber A is a friend of the subscriber B, and the subscriber B is a friend of the subscriber A in the application for the specific SNS.

Like in the friend recommendation method shown in FIG. 14, if the number of calls or messages of the subscriber A transmitted to and received from the other subscriber C is smaller than a predetermined number, the frequency of the calls or messages is smaller than a predetermined frequency, and a specific period of time has elapsed from a point of time at which the last call or message was transmitted or received, the mobile terminal 100 may exclude the other subscriber C from a friend recommendation to the subscriber A.

Figure 15:
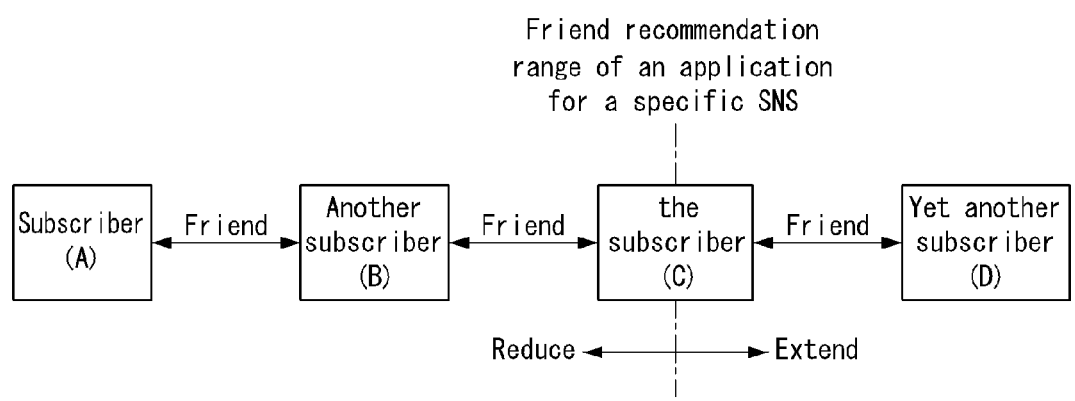
FIG. 15 is a diagram illustrating that the mobile terminal according to the embodiment of the present invention may change the application range of a friend recommendation function in an application for a specific SNS according to a social network formation history for a subscriber of the specific SNS.

FIG. 15 is a diagram showing that the mobile terminal 100 according to the embodiment of the present invention may change the application range of a friend recommendation function in an application for a specific SNS according to a social network formation history for a subscriber A of the specific SNS. In particular, FIG. 15 illustrates that the application range of the friend recommendation function for the subscriber A in the application for the specific SNS is a friend C of a friend B, but may be extended or reduced based on a social network formation history for another subscriber B in an SNS environment in the application for the specific SNS.

For example, if the number or frequency (or both) of social networks of the subscriber A formed for another subscriber B is a predetermined criterion or higher or a point of time at which the subscriber A finally formed a social network with another subscriber B is within a specific period of time from the present time, a range of friend recommendation to the subscriber A may be extended up to a friend D of a friend C who is the friend B of the subscriber A. Also, if the number or frequency (or both) of social networks of the subscriber A formed for another subscriber B is less than a predetermined criterion or a point of time at which the subscriber A finally formed a social network with another subscriber B is before a specific period of time from the present time, a range of friend recommendation to the subscriber A may be reduced.

Figure 16:
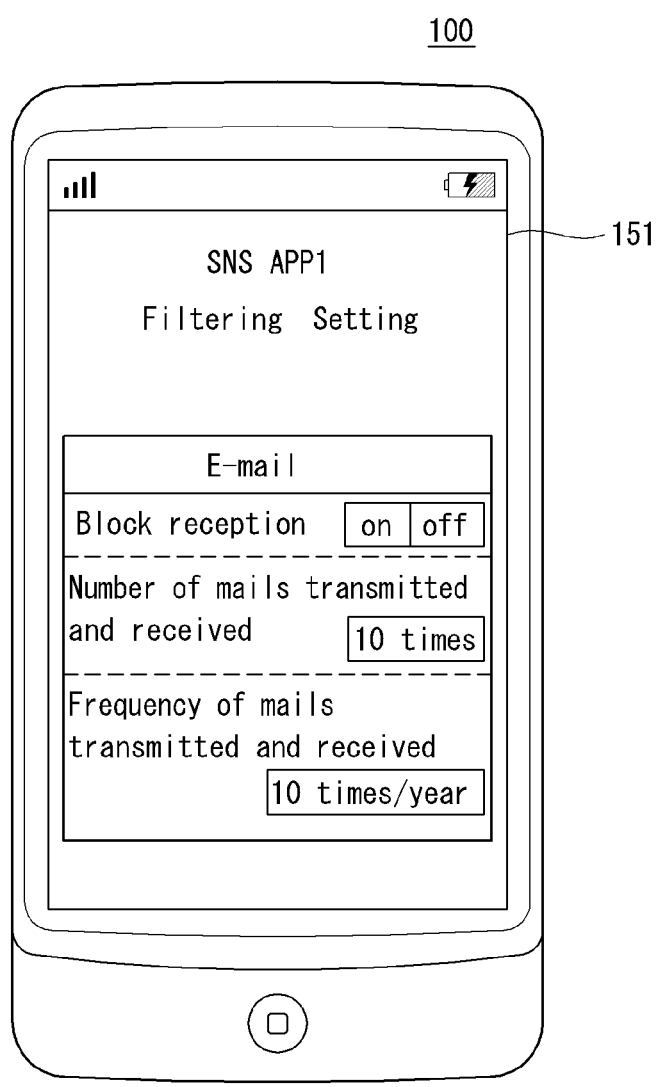
FIG. 16 is a display screen illustrating settings for changing a range of friend recommendation in the mobile terminal according to the embodiment of the present invention.

Next, FIG. 16 shows a screen where the mobile terminal 100 according to the embodiment of the present invention displays settings for changing a range of friend recommendation. In particular FIG. 16 illustrates that a subscriber may change a range of friend recommendation in an application SNS APP1 for the specific SNS so that the other subscriber whose mail received by the subscriber has been blocked in an e-mail system, the other subscriber whose number of mails transmitted to and received from the subscriber is 10 or less, and the other subscriber whose frequency of transmitted to and received from the subscriber is 10 a year may be blocked from a friend recommendation to the subscriber. The settings for changing the range of friend recommendation shown in FIG. 16 is an example according to an embodiment of the present invention, and the scope of the present invention is not limited to the example.

In the mobile terminal 100 according to the embodiment of the present invention described above with reference to FIGS. 7 to 16, the examples illustrate a range of friend recommendation to a subscriber of a specific SNS may be changed based on a social network formation history for the subscriber. Meanwhile, the mobile terminal 100 may change the application range of a recommendation function for the other subscribers of the specific SNS in relation to the subscriber based on a social network formation history for the subscriber.

Figure 17:
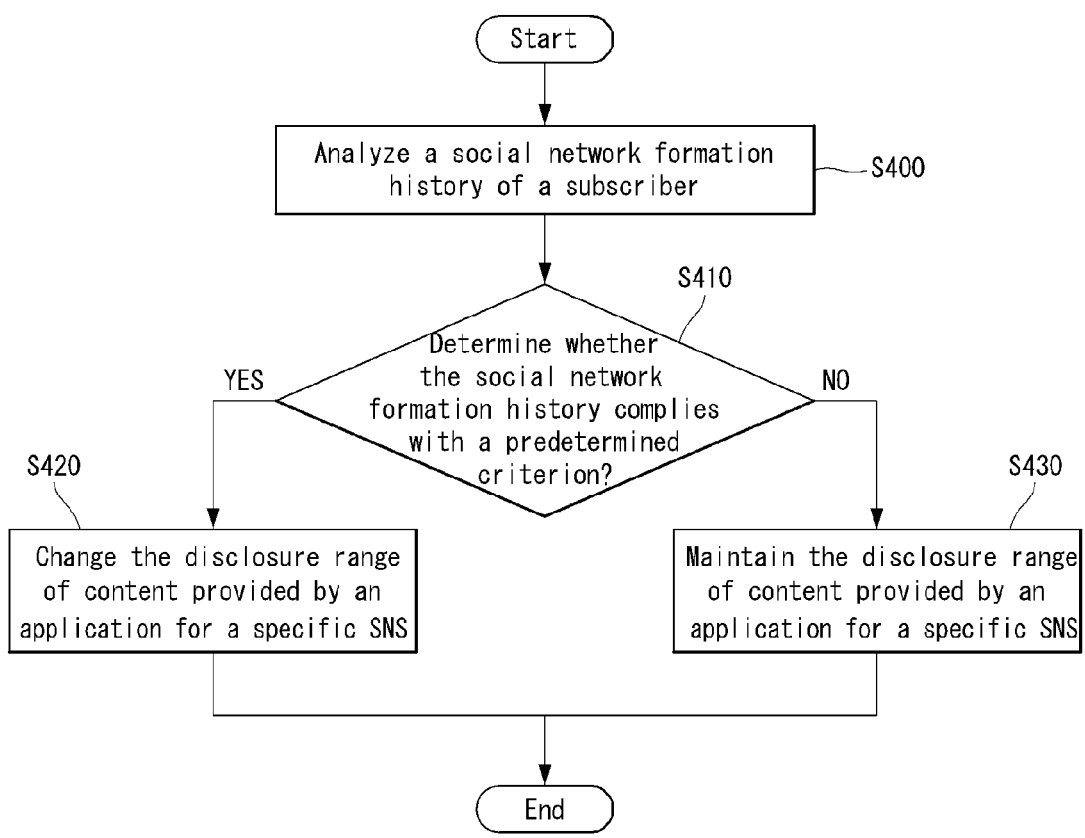
FIG. 17 is a flowchart illustrating another example of the SNS method performed in the mobile terminal according to the embodiment of the present invention.

In particular, FIG. 17 is a flowchart illustrating another example of the SNS method performed in the mobile terminal 100 according to the embodiment of the present invention. More particularly, FIG. 17 is a flowchart illustrating a method of the mobile terminal 100 changing the disclosure range of content, provided by an application for a specific SNS, based on a social network formation history for a subscriber of the specific SNS.

As shown, the controller 180 analyzes the social network formation history for the subscriber which is received from the SNS server 200 through the wireless communication unit 110 (step S400) and determines whether the received social network formation history complies with a predetermined criterion (step S410).

If, as a result of the determination, the social network formation history is determined to comply with the predetermined criterion (Yes in S410), the controller 180 changes the disclosure range of content which is provided by the application for the specific SNS (step S420). If, as a result of the determination, the social network formation history is determined not to comply with the predetermined criterion (No in S410), however, the controller 180 maintains the disclosure range of content without change at step S430. Here, the content related to the subscriber may include writings posted by the subscriber, replies written by the subscriber, files uploaded by the subscriber, writings and replies uploaded by other users regarding the subscriber, files uploaded by other users regarding the subscriber, but the scope of the present invention is not limited thereto.

Examples where the mobile terminal 100 changes the disclosure range of content or information (or both) which is related to the subscriber of the specific SNS is changed are described below with reference to FIGS. 18 to 21. In particular, FIG. 18 shows an example where the mobile terminal 100 according to an embodiment of the present invention excludes the other subscriber C of a specific SNS from the disclosure range of content or information (or both) which is provided by an application for the specific SNS and related to a subscriber A of the specific SNS, if the subscriber A has blocked the other subscriber in the other SNS.

This examples assumes that the disclosure range of the content or information (or both) related to the subscriber A in the application for the specific SNS extends up to a friend who is a friend of the subscriber. The same principle applies to FIGS. 19 to 21 to be described later. Referring to FIG. 18, the mobile terminal 100 does not disclose the content or information (or both) of the subscriber A to the other subscriber C who is a friend of the subscriber B who is a friend of the subscriber A in the application for the specific SNS. This is because the other subscriber C is a subscriber who has been blocked as a friend by the subscriber A in an application for the other SNS.

In this example, the other subscriber C may not view information about the subscriber A and also may not check writings and replies written by the subscriber A, files uploaded by the subscriber A, writings and replies written by other users regarding the subscriber A, files uploaded by other users regarding the subscriber A.

Figure 18:
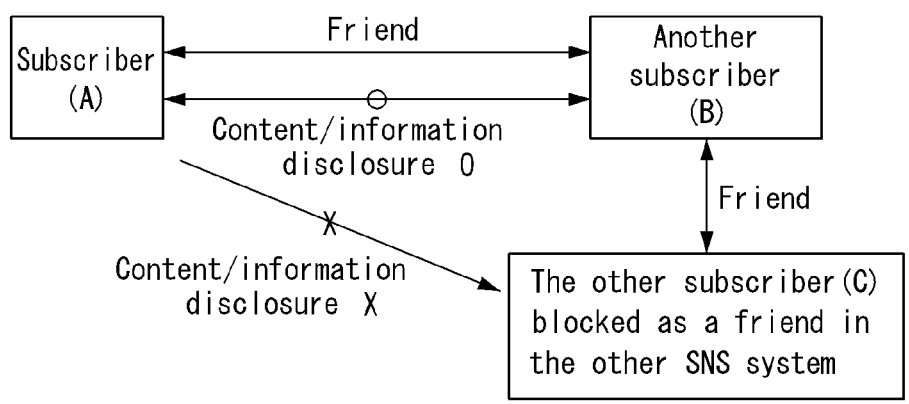
FIG. 18 is a diagram illustrating an example where the mobile terminal according to an embodiment of the present invention excludes the other subscriber of a specific SNS from the disclosure range of content or information (or both) which is provided by an application for the specific SNS and related to a subscriber of the specific SNS, if the subscriber has blocked the other subscriber in the other SNS.

Like in the content or information (or both) disclosure method shown in FIG. 18, if the number of social networks of the subscriber A formed with the other subscriber C is smaller than a predetermined number, the frequency of social networks of the subscriber formed with the other subscriber C is smaller than a predetermined frequency, and a specific period of time has elapsed from a point of time at which the last social network was formed, the mobile terminal 100 may exclude the other subscriber C from the disclosure range of content or information (or both) related to the subscriber A in an application for the other SNS.

Figure 19:
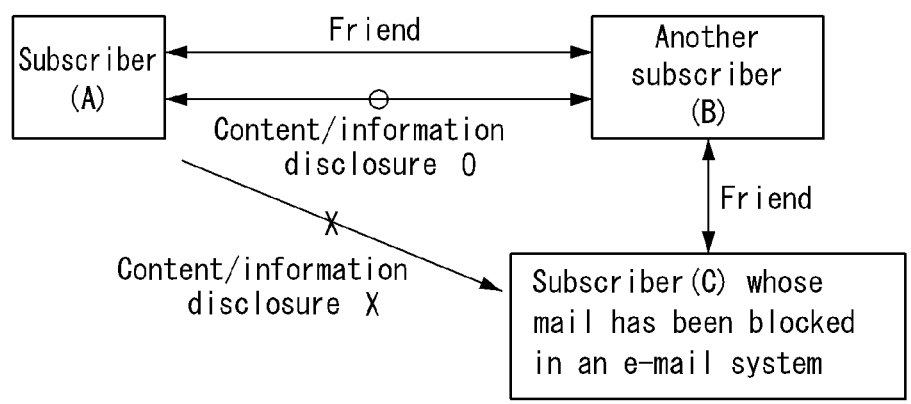
FIG. 19 is a diagram illustrating an example where the mobile terminal according to an embodiment of the present invention excludes the other subscriber of a specific SNS from the disclosure range of content or information (or both) which is provided by an application for the specific SNS and related to a subscriber of the specific SNS, if the subscriber has blocked the other subscriber in an e-mail system.

Next, FIG. 19 shows an example where the mobile terminal 100 according to an embodiment of the present invention excludes the other subscriber C of a specific SNS from the disclosure range of content or information (or both) which is provided by an application for the specific SNS and related to a subscriber A of the specific SNS, if the subscriber A has blocked the other subscriber in an e-mail system.

Referring to FIG. 19, the mobile terminal 100 does not disclose the content or information (or both) of the subscriber A to the other subscriber C who is a friend of another subscriber B who is a friend of the subscriber A in the application for the specific SNS. This is because the other subscriber C is a subscriber whose mail received by the subscriber A has been blocked in the e-mail system.

Like in the content or information (or both) disclosure method shown in FIG. 19, if the mail of the other subscriber C has been set as a spam mail, the number of mails of the subscriber A transmitted to and received from the other subscriber C is smaller than a predetermined number, the frequency of the mails of the subscriber A transmitted to and received from the other subscriber C is smaller than a predetermined frequency, and a specific period of time has elapsed from a point of time at which the last mail was transmitted and received, the mobile terminal 100 may not disclose the content or information (or both) of the subscriber A to the other subscriber C.

Figure 20:
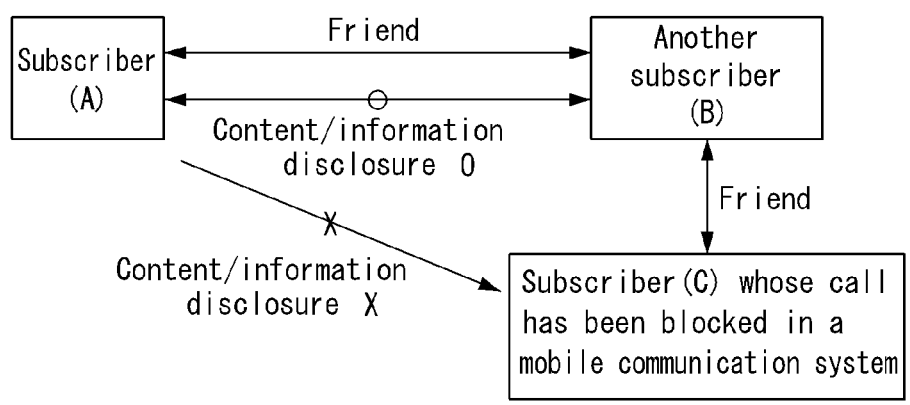
FIG. 20 is a diagram illustrating an example where the mobile terminal according to an embodiment of the present invention excludes the other subscriber of a specific SNS from the disclosure range of content or information (or both) which is provided by an application for the specific SNS and related to a subscriber of the specific SNS, if the subscriber has blocked a call received from the other subscriber in a mobile communication system.

FIG. 20 shows an example where the mobile terminal 100 according to an embodiment of the present invention excludes the other subscriber C of a specific SNS from the disclosure range of content or information (or both) which is provided by an application for the specific SNS and related to a subscriber A of the specific SNS, if the subscriber has blocked a call received from the other subscriber in a mobile communication system.

Referring to FIG. 20, the mobile terminal 100 does not disclose the content or information (or both) of the subscriber A to the other subscriber C who is a friend of another subscriber B who is a friend of the subscriber A in the application for the specific SNS. This is because the other subscriber C is a subscriber whose incoming call received by the subscriber has been blocked by the subscriber A in the mobile communication system.

Like in the content or information (or both) disclosure method shown in FIG. 20, if the number of calls or messages of the subscriber A transmitted to and received from the other subscriber C is smaller than a predetermined number, the frequency of the calls or messages is smaller than a predetermined frequency, or a specific period of time has elapsed from a point of time at which the last call or message was transmitted or received, the mobile terminal 100 may not disclose the content or information (or both) of the subscriber A to the other subscriber C.

Figure 21:
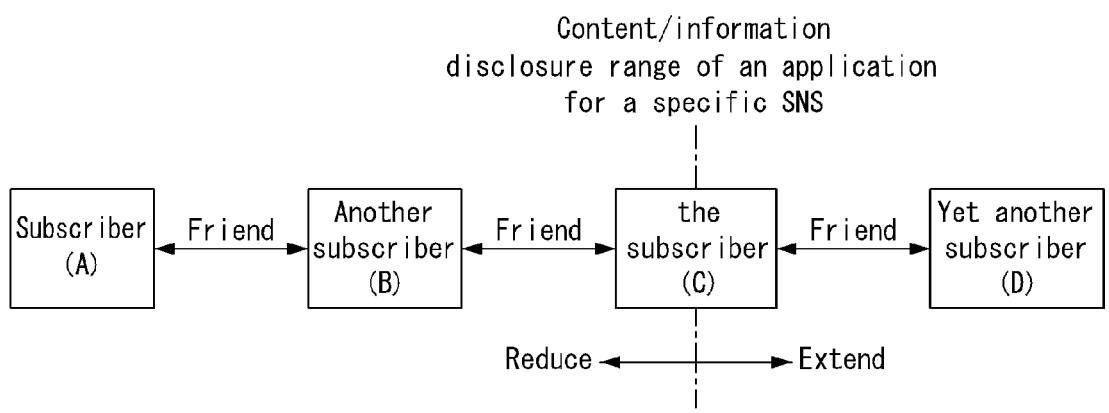
FIG. 21 is a diagram illustrating that the mobile terminal according to the embodiment of the present invention may change the disclosure range of content or information (or both), related to a subscriber of a specific SNS, in an application for the specific SNS according to a social network formation history for the subscriber.

FIG. 21 is a diagram showing that the mobile terminal 100 according to the embodiment of the present invention may change the disclosure range of content or information (or both), related to a subscriber A of a specific SNS, in an application for the specific SNS according to the social network formation history for the subscriber A. In particular, FIG. 21 illustrates that a range of the content or information (or both) related to the subscriber A in the application for the specific SNS extends up to a friend C of a friend B, but be extended or reduced based on a social network formation history in the application for the specific SNS in the SNS environment of the subscriber B.

For example, if the number or frequency (or both) of social networks of the subscriber A formed with another subscriber B is greater than a predetermined criterion or a point of time at which the latest social network of the subscriber A was formed with another subscriber B is within a specific period of time from the present time, the disclosure range of content or information (or both) related to the subscriber A may be extended up to a friend D who is a friend of the friend C who is the friend B of the subscriber A. If the number or frequency (or both) of social networks of the subscriber A formed with another subscriber B is smaller than a predetermined criterion or a point of time at which the latest social network of the subscriber A was formed with another subscriber B is before a specific period of time from the present time, however, the disclosure range of content or information (or both) related to the subscriber A may be reduced.

In addition, the setting for changing the disclosure range of content or information (or both) related to a subscriber of a specific SNS in the mobile terminal 100 according to the embodiment of the present invention may be performed, like the setting for changing the range of friend recommendation which has been described with reference to FIG. 16.

The examples where the mobile terminal 100 according to the embodiment of the present invention may change the disclosure range of content or information (or both) related to a subscriber of a specific SNS based on a social network formation history for the subscriber have been described above with reference to FIG. 17 to FIG. 21. On the other hands, the mobile terminal 100 may change the disclosure range of content or information (or both), related to another subscriber of a specific SNS, to the subscriber based on a social network formation history for the subscriber.

The above-described social networking service method may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
  a communication unit configured to receive a social network formation history comprising relationship information between a subscriber of a first Social Networking Service (SNS) and at least one of other subscribers of the first SNS, wherein the social network formation history further comprises relationship information in a second SNS between the subscriber and the at least one of other subscribers; and
  a controller configured to change a range of the other subscribers for applying a function, wherein the function is provided by an application for the first SNS to form a social network based on the received social network formation history for the subscriber.

2. The electronic device as claimed in claim 1, wherein the social network formation history for the subscriber comprises at least one of whether the subscriber has blocked a social network formed with the other subscribers, a number of social networks of the subscriber formed with the other subscribers, a frequency of social networks of the subscriber formed with the other subscribers, and a point of time at which the subscriber formed a social network with the other subscribers.

3. The electronic device as claimed in claim 2, wherein when the function is a recommendation function provided by the application for the first SNS, the controller is further configured to change the application range of the recommendation function so that a social network formed based on the social network formation history for the subscriber complies with a predetermined criterion.

4. The electronic device as claimed in claim 3, wherein the recommendation function comprises at least one of a recommendation to the subscriber regarding the other subscribers and a recommendation to the other subscribers regarding the subscriber.

5. The electronic device as claimed in claim 4, wherein if the social network formation history for the subscriber complies with the predetermined criterion, the controller is further configured to extend or reduce the application range of the recommendation function.

6. The electronic device as claimed in claim 5, wherein if the social network formation history for the subscriber complies with the predetermined criterion, the controller is further configured to extend or reduce at least one of a range of other subscribers recommended to the subscriber and a range of other subscribers to which the subscriber is recommended.

7. The electronic device as claimed in claim 2, wherein the controller is further configured to change a disclosure range of content provided by the application for the first SNS according to whether the social network formation history for the subscriber complies with a predetermined criterion.

8. The electronic device as claimed in claim 7, wherein the disclosure range of the content provided by the application for the first SNS comprises at least one of a disclosure of content, related to the subscriber, to the other subscribers and a disclosure of content, related to the other subscribers, to the subscriber.

9. The electronic device as claimed in claim 8, wherein if the social network formation history for the subscriber complies with the predetermined criterion, the controller is further configured to extend or reduce the disclosure range of the content provided by the application for the first SNS.

10. A method of controlling an electronic device, the method comprising:
receiving, via a communication unit of the electronic device, a social network formation history comprising relationship information between a subscriber of a first Social Networking Service (SNS) and at least one of other subscribers of the first SNS, wherein the social network formation history further comprises relationship information in a second SNS between the subscriber and the at least one of other subscribers; and
changing, via a controller of the electronic device, a range of the other subscribers for applying a function, wherein the function is provided by an application for the first SNS to form a social network based on the received social network formation history for the subscriber.

11. The method as claimed in claim 10, wherein the social network formation history for the subscriber comprises at least one of whether the subscriber has blocked a social network formed with the other subscribers, a number of social networks of the subscriber formed with the other subscribers, a frequency of social networks of the subscriber formed with the other subscribers, and a point of time at which the subscriber formed a social network with the other subscribers.

12. The method as claimed in claim 11, wherein when the function is a recommendation function provided by the application for the first SNS, the changing step changes the application range of the recommendation function so that a social network formed based on the social network formation history for the subscriber complies with a predetermined criterion.

13. The method as claimed in claim 12, wherein the recommendation function comprises at least one of a recommendation to the subscriber regarding the other subscribers and a recommendation to the other subscribers regarding the subscriber.

14. The method as claimed in claim 13, wherein if the social network formation history for the subscriber complies with the predetermined criterion, the changing step extends or reduces the application range of the recommendation function.

15. The method as claimed in claim 14, wherein if the social network formation history for the subscriber complies with the predetermined criterion, the changing step extends or reduces at least one of a range of other subscribers recommended to the subscriber and a range of other subscribers to which the subscriber is recommended.

16. The method as claimed in claim 11, wherein the changing step changes a disclosure range of content provided by the application for the specific first SNS according to whether the social network formation history for the subscriber complies with a predetermined criterion.

17. The method as claimed in claim 16, wherein the disclosure range of the content provided by the application for the first SNS comprises at least one of a disclosure of content, related to the subscriber, to the other subscribers and a disclosure of content, related to the other subscribers, to the subscriber.

18. The method as claimed in claim 17, wherein if the social network formation history for the subscriber complies with the predetermined criterion, the changing step extends or reduces the disclosure range of the content provided by the application for the first SNS.

19. A non-transitory computer readable medium storing a program for controlling a mobile terminal, the program comprising:
a first computer code to receive and read a social network formation history comprising relationship information between a subscriber of a first Social Networking Service (SNS) and at least one of other subscribers of the first SNS, wherein the social network formation history further comprises relationship information in a second SNS between the subscriber and the at least one of other subscribers; and
a second computer code configured to change a range of the other subscribers for applying a function, wherein the function is provided by an application for the first SNS to form a social network based on the received social network formation history for the subscriber.

20. The non-transitory computer readable storage medium as claimed in claim 19, wherein the social network formation history for the subscriber comprises at least one of whether the subscriber has blocked a social network formed with the other subscribers, a number of social networks of the subscriber formed with the other subscribers, a frequency of social networks of the subscriber formed with the other subscribers, and a point of time at which the subscriber formed a social network with the other subscribers.

* * * * *